United States Patent
Fahldiek

(10) Patent No.: US 9,725,290 B2
(45) Date of Patent: Aug. 8, 2017

(54) DEVICE FOR GRIPPING AND HOLDING PET BOTTLES

(75) Inventor: Andreas Fahldiek, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 608 days.

(21) Appl. No.: 12/937,919

(22) PCT Filed: Apr. 3, 2009

(86) PCT No.: PCT/EP2009/002489
§ 371 (c)(1),
(2), (4) Date: Oct. 14, 2010

(87) PCT Pub. No.: WO2009/127334
PCT Pub. Date: Oct. 22, 2009

(65) Prior Publication Data
US 2011/0042537 A1    Feb. 24, 2011

(30) Foreign Application Priority Data
Apr. 18, 2008 (DE) .................. 10 2008 019 766

(51) Int. Cl.
*B67C 3/24* (2006.01)
*B65G 47/86* (2006.01)
(Continued)

(52) U.S. Cl.
CPC ............ *B67C 3/242* (2013.01); *B65G 47/847* (2013.01); *B08B 9/42* (2013.01); *B08B 9/426* (2013.01); *B67C 7/0053* (2013.01)

(58) Field of Classification Search
CPC ........ B65G 47/90; B65G 47/847; B67C 3/24; B67C 3/242; B67C 3/246; B67C 3/42; B67C 7/0053; B08B 9/42; B08B 9/426

USPC .......... 248/312, 226.11, 230.1, 230.4, 230.5, 248/230.6, 230.7, 309, 110, 113, 229.1, 248/316.6, 316.1, 316.5, 231.81, 231.41, 248/245, 229.24, 313, 369; 16/111.1,
(Continued)

(56) References Cited

U.S. PATENT DOCUMENTS 2,220,234 A * 11/1940 Hadaway ............... A01K 97/10
248/316.5
2,579,878 A * 12/1951 Stone ....................... B25B 5/06
24/136 R
(Continued)

FOREIGN PATENT DOCUMENTS

DE           29713510          8/1998
DE     EP 2379432 A1 * 10/2011 ........... B65G 47/847
(Continued)

*Primary Examiner* — Muhammad Ijaz
(74) *Attorney, Agent, or Firm* — Occhiuti & Rohlicek LLP

(57) ABSTRACT

The invention relates to a device (1) for gripping and holding PET bottles in filling systems or the like, having a carrier body (3) that can be mounted on a star-shaped element (2) or the like, and spring-loaded gripper arms (7) that can pivot on said carrier body. The aim of the invention is to allow simple, rapid, and low-cost replacement of the gripper arms. To achieve this, a fixing element (11) is positioned between the bearing ends (13) of the gripper arm (7), wherein the bearing ends (13) of the gripper arms comprise an edge recess (14) allowing removal of the gripper arm (7) past the fixing element (11) when a gripper arm (7) is positioned in the extreme opening position.

13 Claims, 4 Drawing Sheets

(51) Int. Cl.
*B67C 7/00* (2006.01)
*B08B 9/42* (2006.01)

(58) Field of Classification Search
USPC .............. 16/406, 411, 425; 294/115, 99.1;
198/470.1
See application file for complete search history.

(56) References Cited

U.S. PATENT DOCUMENTS

| | | | | |
|---|---|---|---|---|
| 3,155,228 A * | 11/1964 | Norwood | ................ | B65B 43/54 198/803.7 |
| 3,238,587 A * | 3/1966 | Goinard | ......................... | 24/602 |
| 3,996,822 A * | 12/1976 | Battista | .......................... | 81/367 |
| 4,172,514 A * | 10/1979 | Shantz | ................. | B65G 47/842 198/470.1 |
| 5,607,045 A * | 3/1997 | Hermann Kronseder | ................ | B08B 9/42 198/476.1 |
| 5,711,411 A * | 1/1998 | Zurweller | ............... | B67C 3/242 198/379 |
| 5,743,377 A * | 4/1998 | Kronseder | ........... | B65G 47/847 198/470.1 |
| 5,778,633 A * | 7/1998 | Sweeny | .................. | B65B 43/60 53/201 |
| 5,893,700 A * | 4/1999 | Kronseder | ............. | B08B 9/426 198/803.9 |
| 6,779,770 B2 * | 8/2004 | Kaupp | .................. | B60N 3/101 224/926 |
| 6,796,342 B2 * | 9/2004 | De Antoni Migliorati | ............. | B67C 7/0053 141/165 |
| 6,959,953 B2 * | 11/2005 | Graffin | .................... | B67C 3/242 198/470.1 |
| 7,000,756 B2 * | 2/2006 | Wittmann | ............. | B65G 47/847 198/470.1 |
| 7,159,281 B1 * | 1/2007 | Irizarry | ................... | A45F 5/021 224/247 |
| 8,206,144 B2 * | 6/2012 | Ng | ...................... | B29C 49/4205 198/803.4 |
| 8,439,181 B2 * | 5/2013 | Hausladen | .............. | B08B 9/426 198/470.1 |
| 8,672,376 B1 * | 3/2014 | Wilson | ................. | B25J 15/0028 294/116 |
| 2010/0193652 A1 * | 8/2010 | Stajos et al. | ............. | 248/231.91 |
| 2011/0042537 A1 * | 2/2011 | Fahldiek | ................. | B67C 3/242 248/313 |
| 2011/0197995 A1 * | 8/2011 | Bodtlander | ............ | B65G 29/00 141/269 |
| 2011/0308666 A1 * | 12/2011 | Bodtlander | ............ | B67C 3/242 141/165 |
| 2014/0008927 A1 * | 1/2014 | Rousseau | ............ | B29C 49/4205 294/90 |
| 2014/0251754 A1 * | 9/2014 | Hoellriegl | .............. | B29C 49/28 198/345.1 |
| 2015/0091316 A1 * | 4/2015 | Fahldieck | ............... | B08B 9/426 294/99.1 |
| 2015/0314966 A1 * | 11/2015 | Fahldieck | ............... | B65G 47/847 294/199 |
| 2015/0321858 A1 * | 11/2015 | Fahldieck | ............... | B65G 47/847 294/192 |
| 2016/0347556 A1 * | 12/2016 | Fahldieck | ............... | B65G 47/846 |

FOREIGN PATENT DOCUMENTS

| | | | | |
|---|---|---|---|---|
| DE | 102010052348 A1 * | 5/2012 | ........... | B65G 47/847 |
| EP | 1 277 693 | 1/2003 | | |
| EP | 1277693 A1 * | 1/2003 | | |
| FR | WO 2008132090 A1 * | 11/2008 | ......... | B29C 49/4205 |
| WO | 2008/009410 | 1/2008 | | |

* cited by examiner

DEVICE FOR GRIPPING AND HOLDING
PET BOTTLES

CROSS-REFERENCE TO RELATED
APPLICATIONS

Under 35 USC 371, this application is the National Stage of International Application No. PCT/EP2009/002489, filed on Apr. 3, 2009, which claims the benefit of German Application Serial No. 10 2008 019 766.1, filed on Apr. 18, 2008. The contents of both of the foregoing applications are hereby incorporated by reference in their entirety.

FIELD OF DISCLOSURE

The invention relates to a device for gripping and holding PET bottles in filling systems or the like, having a carrier body that can be mounted on a star-shaped element or the like, and spring-loaded gripper arms that can pivot on the carrier body.

BACKGROUND

In the case of bottle filling systems, there exist a wide range of solutions for grippers that guide and hold the bottles as they traverse a route through the system. As they do so, the bottles must be partially turned, reliably guided and grasped.

DE 297 13 510 U shows an example of a gripper on a rotational conveyor in which gripper arms are pivotably mounted on a carrier plate. The gripper arms have a compression spring between ends thereof that are opposite the gripper jaws. The compression spring forces these gripper arms into the closing position. In this case, the bottles can be pushed in via entry bevels at the front sides of the gripper arms with compression of the spring, and in turn pulled out again.

These gripper arms eventually wear. And even if they are not worn, it may be necessary to reconfigure the bottle filling system to accommodate different kinds of bottles.

It is therefore desirable to replace these gripper arms as simply and rapidly as possible when wear makes replacement necessary, or when grippers are to be adapted to different bottle neck dimensions. Rapid and simple retrofitting of gripper arms is thus a desirable feature.

SUMMARY

The aim of the present invention is to allow simple, rapid, and low-cost replacement of the gripper arms.

To achieve this aim, a fixing element is positioned between the bearing ends of the gripper arms. The bearing ends of the gripper arms have an edge recess that allows removal of the gripper arm past the fixing element when a gripper arm is positioned in an extreme opening position. This configuration enables the creation of a type of rapid closure that allows a rapid, simple replacement of the gripper arms.

The gripper arms are expediently mounted on a trunnion for rotation of the gripper arms. The trunnion can also be removed from the carrier body where necessary in the event of such a replacement.

Alternatively or additionally, the fixing element can be movable between a position holding the bearing ends of the gripper arms and a position releasing the bearing ends. In one embodiment, a fixing element is formed as an eccentric disc, an eccentric plate-shaped head, or the like. It is thus possible, by a simple rotation of the fixing element, to release the pivot or bearing ends of the gripper arms so that they can be replaced.

The invention also provides, in a further configuration, that the gripper arms are equipped at the bearing end thereof, which is opposite the respective gripper end, with trunnions that can be introduced into the carrier body, and a mounting journal positioned between a bearing end and a gripper end for a tension spring that acts in the closing direction, which in turn ensures that the tension spring is freely accessible to enable simple replacement.

A further configuration of the invention also serves this purpose. This configuration includes equipping the mounting journals with ring grooves for tool-free fitting of the tension spring.

An additional configuration of the invention also serves the purpose of rapid replacement of such devices. In this configuration, the carrier body has lateral, deformable, assembly brackets composed of an elastic material for clamping bearings on fixing elements on a transport star-shaped element, rinser, filler or the like.

In some embodiments, the carrier body in total is formed from an elastic material.

The above-mentioned measures make it possible for rapid, simple and low-cost replacement of the gripper arms on such machine parts so that the machines can be retrofitted easily and rapidly and cost-effectively if, for example, bottles having a different neck size are to be acted upon.

BRIEF DESCRIPTION OF THE DRAWINGS

Further details, features and advantages of the invention will become apparent on the basis of the following description and with reference to the drawings, in which.

DETAILED DESCRIPTION

Figures 9, 10:
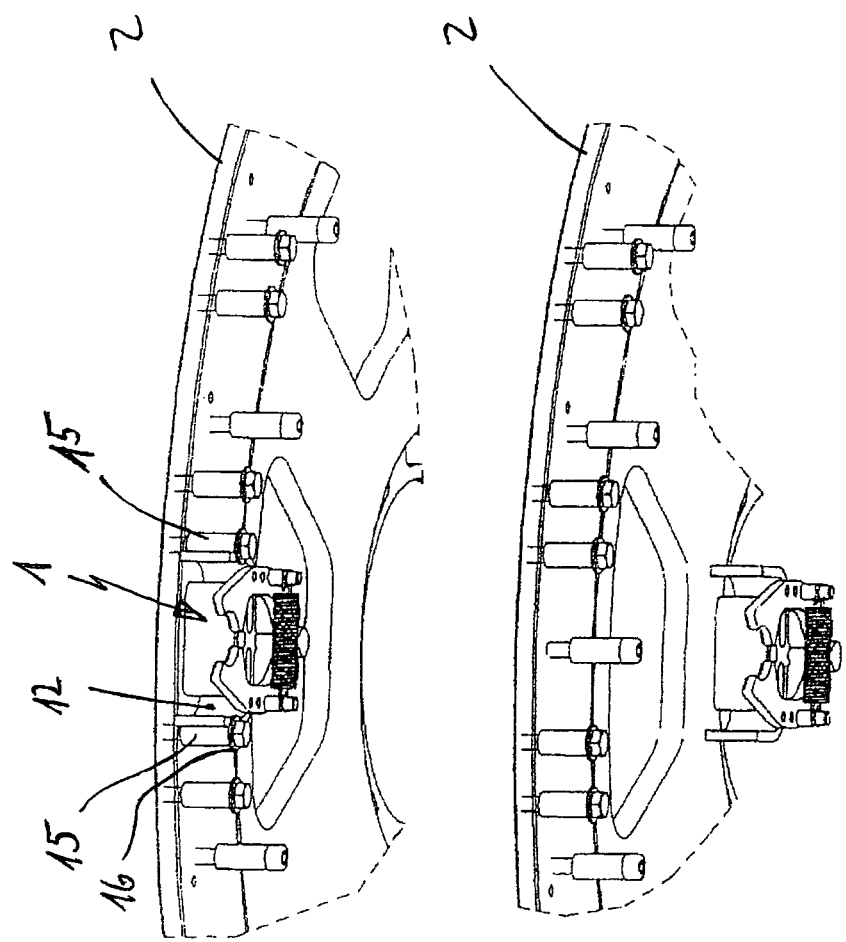
FIG. 9 shows a partial view of a star-shaped element with an installed device according to the invention.
FIG. 10 shows the star-shaped element of FIG. 9 with a device having been removed therefrom.

A plurality of devices 1 is positioned on a star-shaped element 2 or the like. A section of the star-shaped element 2 can be seen in FIGS. 9 and 10.

Figure 1:
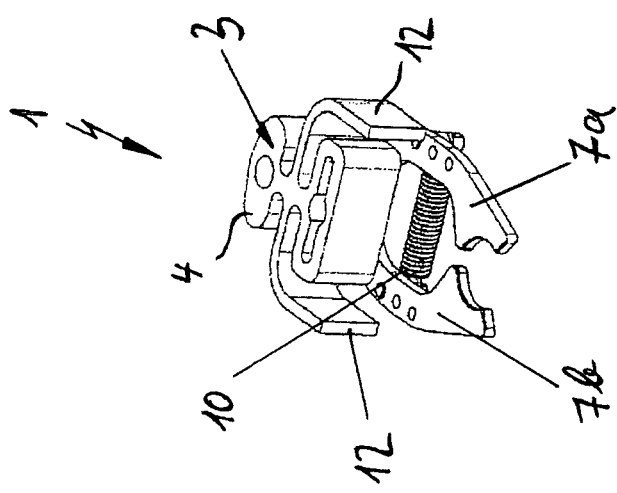
FIG. 1 shows a top view of a gripper device according to the invention.
Figure 8:
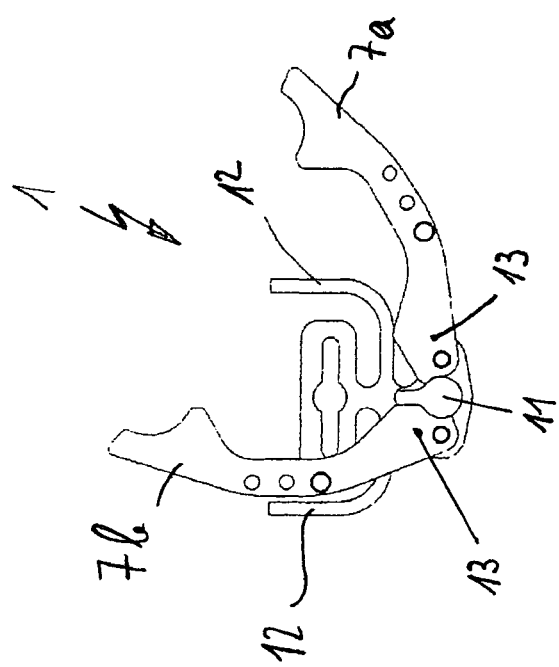
FIG. 8 shows the device with a gripper arm that has been lifted out.

Referring to FIGS. 1 and 8, a device 1 is formed by a carrier body 3 composed of an elastic material. The carrier body 3 has, in a shoulder 4 thereof, recesses 5 for receiving pivot pins 6 on which a gripper arm 7a, 7b is mounted.

Each gripper arm 7a, 7b has a mounting journal 8a, 8b that projects to the outside. Each journal is equipped with a groove 9 to receive ring ends of a tension spring 10 that forces both gripper arms 7a, 7b into a closing position.

Figure 3:
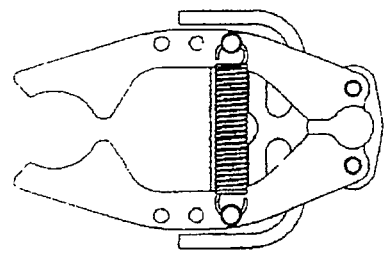
FIG. 3 shows a top view of the device.
Figure 2:
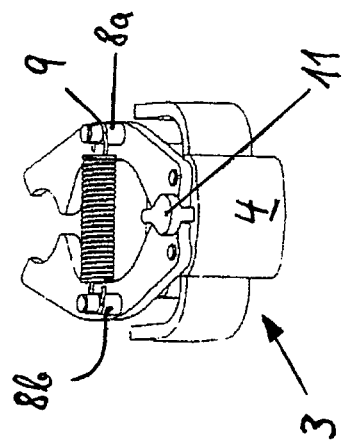
FIG. 2 shows a top view from an opposite side of the gripper device.
Figure 7:
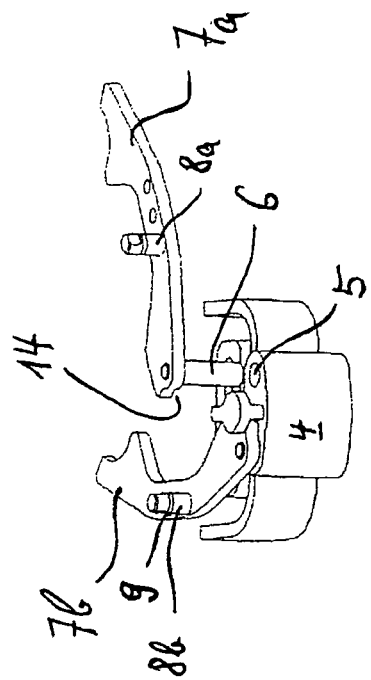
FIG. 7 shows a top view of the device with the spring removed.

As is apparent from the figures, in particular FIGS. 2 and 7, a fixing element 11 is positioned in the carrier body 3, on the shoulder 4. The fixing element 11 overlaps bearing ends 13 in FIG. 7 with a plate-shaped head in a blocking manner.

To lift out a gripper arm without tools, as shown in FIG. 8, one need only release the tension spring 10 and upwardly pivot the gripper arm 7a, 7b that is to be replaced into an extreme lateral position, as shown in FIGS. 7 and 8.

In the embodiment represented in FIGS. 7 and 8, the ability to lift out the gripper arms 7a, 7b arises from having a rebound or a countersinking 14 in the bearing ends 13 of gripper arms 7.

In some embodiments, the fixing element 11 has an eccentric plate-shaped head that is configured such that rotation of the fixing element 11 releases a corresponding bearing end 13 of each pivot arm 7.

For simple, tool-free replacement of an entire device 1, the carrier body 3 has an elastically deformable flap that can clamp on the star-shaped element between support pins 15. The support pins 15 have plate-shaped heads or shims 16 that prevent the elastically deformable flap 12 from falling out.

Figure 4:
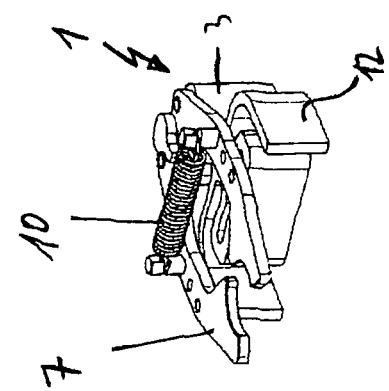
FIGS. 4 to 6 show views of the device according to the invention with different gripper arms.
Figure 5:
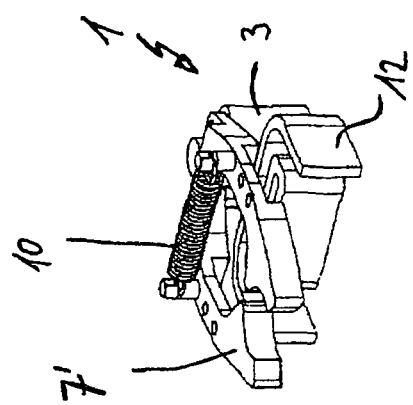
Figure 6:
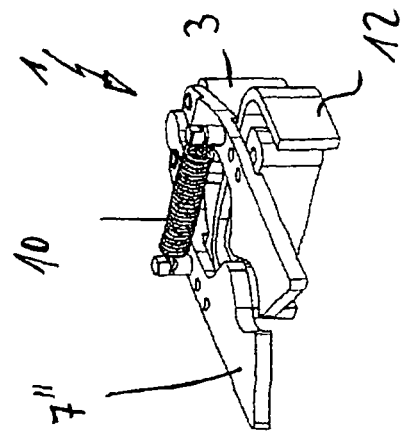

FIGS. 4 to 6 show gripper arms 7, 7' and 7" of various configurations that can clearly be replaced with one another by simple steps.

Of course, the described exemplary embodiment of the invention can be amended in a wide range of aspects without departing from the basic concept. The invention is thus in particular not restricted to a specific material of the carrier body or a specific form of the gripper arms.

The invention claimed is:

1. A device for gripping and holding PET bottles in filling systems, said device comprising: a carrier body configured for being mounted on section of a star-shaped element, spring-loaded gripper arms that can pivot on said carrier body,
wherein each of said gripper arms has a first side, a second side opposite said first side, and a pivot end, a tension spring for said gripper arms, and a fixing element positioned between the pivot ends such that an inner surface of said fixing element faces an inner surface of said pivot ends, wherein the gripper arms pivot on the carrier body about pivot axes that pass through said respective pivot ends, wherein each of said pivot ends includes an edge recess allowing removal of the respective gripper arm past the fixing element when the gripper arm is positioned in an extreme opening position, wherein said edge recess is located at the respective pivot end of the gripper arm and faces away from said first and second sides of said pivot arm, wherein said gripper arms are movable between a first position and a second position, wherein in the first position, the fixing element holds the pivot ends of the gripper arms by overlapping said pivot ends so that said gripper arms cannot be lifted past said fixing element, wherein in said first position, said fixing element faces away from said edge recess, and wherein in the second position, the fixing element releases the pivot ends of the gripper arms by permitting the gripper arms to be lifted past said fixing element.

2. The device according to claim 1, wherein the fixing element comprises an eccentric disc.

3. The device according to claim 1, wherein the gripper arms each have a gripper end opposite the pivot end, and wherein the device further comprises, at each of said gripper arms, a trunnion disposed at the respective pivot ends for introduction into the carrier body, and a mounting journal positioned between the respective pivot ends and the gripper ends for engaging the tension spring, the tension spring acting in a direction urging the gripper arms to close.

4. The device according to claim 1, wherein the carrier body comprises lateral, deformable assembly brackets comprising an elastic material.

5. A device for gripping and holding PET bottles in filling systems, said device comprising: a carrier body configured for being mounted on a section of a star-shaped element, spring-loaded gripper arms that can pivot on said carrier body, wherein each of said gripper arms has a first side, a second side opposite said first side, and a pivot end, and an eccentric plate-shaped head positioned between the pivot ends such that an inner surface of said eccentric plate-shaped head faces an inner surface of said pivot ends, and wherein the pivot ends each include an edge recess allowing removal of the gripper arm past the eccentric plate-shaped head when the gripper arm is positioned in an extreme opening position, wherein the pivot arms pivot on the carrier body about their respective pivot axes, and wherein said pivot axes pass through said respective pivot ends.

6. The device according to claim 5, wherein the gripper arms each have a gripper end opposite the pivot end, and wherein the device further comprises, at each of said gripper arms, a trunnion disposed at the pivot end for introduction into the carrier body, and a mounting journal positioned between the respective pivot ends and the gripper end for engaging a tension spring, the tension spring acting in a direction urging the gripper arms to close.

7. The device according to claim 5, wherein the carrier body comprises lateral, deformable assembly brackets comprising an elastic material.

8. A device for gripping and holding PET bottles in filling systems, said device comprising: a carrier body configured for being mounted on a section of a star-shaped element, spring-loaded gripper arms that can pivot on said carrier body, each of said gripper arms having a pivot end having an edge recess, a gripper end opposite said pivot end, a trunnion disposed at the pivot end for introduction into the carrier body, and a mounting journal positioned between the pivot end and the gripper end, a tension spring engaged by said mounting journals, said tension spring being configured to urge said gripper ends together, and a fixing element positioned between the pivot ends such that an inner surface of said fixing element faces an inner surface of said pivot ends, wherein the pivot arms pivot on the carrier body about pivot axes that pass through said respective pivot ends, wherein said fixing element is disposed to fix said gripper arms to said carrier body when said gripper arms are in a fixing position and wherein, for each of said gripper arms, said edge recess of said gripper arm permits removal of the gripper arm past the fixing element when the gripper arm is positioned in an extreme opening position.

9. The device according to claim 8, wherein the mounting journal comprises a ring groove for tool-free fitting of the tension spring.

10. The device according to claim 9, wherein the carrier body comprises lateral, deformable assembly brackets comprising an elastic material.

11. The device according to claim 8, wherein the carrier body comprises lateral, deformable assembly brackets comprising an elastic material.

12. A device for gripping and holding PET bottles in filling systems, said device comprising: a carrier body configured for being mounted on a section of a star-shaped element, spring-loaded gripper arms that can pivot on said carrier body, each of said gripper arms having a pivot end, said pivot end comprising an edge recess, each of said gripper arms being configured to pivot on said carrier body about a pivot axis that passes through said pivot end, and a fixing element positioned between the pivot ends, said fixing element configured to prevent removal of the gripper arm past the fixing element unless the edge recess is positioned to permit said removal as a result of the gripper arm having been positioned in an extreme opening position, and wherein the carrier body comprises lateral, deformable assembly brackets comprising elastic material.

13. The device according to claim 12, wherein the entire carrier body comprises elastic material.

\* \* \* \* \*